(12) United States Patent
Lang et al.

(10) Patent No.: US 6,949,155 B1
(45) Date of Patent: Sep. 27, 2005

(54) FILTER ELEMENT COMPRISING AN EMBOSSED WELD CONNECTION CLIP AND DEVICE FOR PRODUCING THE SAME

(75) Inventors: Jürgen Lang, Sulzbach-Altenwald (DE); Harald Mees, Lebach (DE); Michael Sakraschinsky, St. Ingbert (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 9 days.

(21) Appl. No.: 09/979,865

(22) PCT Filed: Jul. 18, 2000

(86) PCT No.: PCT/EP00/06845

§ 371 (c)(1),
(2), (4) Date: Nov. 29, 2001

(87) PCT Pub. No.: WO01/05483

PCT Pub. Date: Jan. 25, 2001

(30) Foreign Application Priority Data

Jul. 20, 1999 (DE) ................................ 199 33 163

(51) Int. Cl.$^7$ ........................................... B01D 29/11
(52) U.S. Cl. ................ 156/73.1; 210/497.01; 210/493.5; 55/498; 156/203; 156/209; 156/219; 156/580.1; 156/581
(58) Field of Search ................ 210/493.1, 493.5, 210/497.01; 55/497, 521, 498; 264/509, 264/220, 222, 271.1, 273, 274; 156/73.1, 156/66, 209, 203, 240, 244.16, 244.27, 261–262, 156/216–217, 580.1, 581, 219; 29/896.6–896.62; 100/33 R, 33 PB

(56) References Cited

U.S. PATENT DOCUMENTS

| 3,468,731 A | * | 9/1969 | Obeda ........................ 156/73.1 |
| 3,692,184 A |   | 9/1972 | Miller, Jr. et al. |
| 3,865,919 A | * | 2/1975 | Pall et al. .................... 264/259 |
| 3,867,294 A | * | 2/1975 | Pall et al. .................... 210/489 |
| 4,184,966 A | * | 1/1980 | Pall .......................... 210/493.2 |
| 4,576,852 A | * | 3/1986 | Burgess et al. ............. 428/171 |
| 4,588,464 A |   | 5/1986 | Miyagi et al. |
| 4,735,720 A | * | 4/1988 | Kersting .................. 210/493.5 |
| 4,767,492 A | * | 8/1988 | Fukusima et al. ....... 156/580.2 |
| 5,114,508 A | * | 5/1992 | Miyagi et al. ................ 156/69 |
| 5,762,796 A | * | 6/1998 | Zraik ....................... 210/493.1 |
| 6,230,777 B1 | * | 5/2001 | Hedlund et al. ............ 156/443 |

FOREIGN PATENT DOCUMENTS

| EP | 0001407 | 2/1981 |
| EP | 0695211 | 4/1997 |
| WO | 9910080 | 3/1999 |

OTHER PUBLICATIONS

Hawley's Condensed Chemical Dictionary (Lewis, Richard J. Sr., John Wiley & Sons, Inc., 13$^{th}$ edition, copywirght 1997, p. 897).*

* cited by examiner

*Primary Examiner*—Terry K. Cecil
(74) *Attorney, Agent, or Firm*—Roylance, Abrams, Berdo & Goodman, L.L.P.

(57) ABSTRACT

A tubular filter element and a device for producing the same for filtering fluids includes a filter mate. The facing ends of the filter mat are fixed in position by a connecting device which at least partially overlaps the filter mat.

20 Claims, 5 Drawing Sheets

FILTER ELEMENT COMPRISING AN EMBOSSED WELD CONNECTION CLIP AND DEVICE FOR PRODUCING THE SAME

FIELD OF THE INVENTION

The present invention relates to a tubular filtering assembly for the filtration of fluids, including a filter mat. The ends of the filter mat join one another, and are affixed in their position by a connection device which at least partially overlaps the ends. The connection device formed of a thermally deformable plastic is welded together with the ends of the filter mat. The connection device is configured as a connection strip forming a clip element which is thrust onto the filter mat ends where it holds them together during the thermal welding process. Without any additional welding, the clip while in melted state is connected with the filter mat ends.

BACKGROUND OF THE INVENTION

Filtering assemblies serve for the filtration of liquids, for example, in the form of hydraulic power oil or solutions of that type, for example in the form of genuine suspensions, dispersions, emulsions or colloidal solutions. Such filtering assemblies have generally proven themselves reliable in use on account of their compact structure and their large filter surface. In order to guarantee that the fluid flow passes only through the proper filter medium, on the two end caps, the connection point of the two ends of the filter mat are adjacent to one another and adjacent to the seal, and are in the form of terminal webs or crosspieces to form one of the critical points which are to be closed off without leakage.

The known filtering assemblies available on the market today have a zigzag-folded or pleated filter mat composed of different filter materials for use under different circumstances. The filter mat is arranged around a solid support pipe arranged in the interior of the filtering assembly and provided with apertures. A fine-mesh wire netting encloses the filter mat to protect it from damage from the exterior. The netting is contiguous with and follows the folding path of the filter mat. In the case of the known filtering assembly, the connection point of the two filter mat ends, the same as the connection of the filter mat with the end caps, is attained by application of an adhesive layer, for example epoxy resin adhesive. Dependent upon the adhesive being used, considerable waiting time is required during the further processing or further use of the filtering assembly, until the adhesive following its gelling or cure time can be further processed and then placed under the stress of use and until it can be used again following its hardening time.

With one known tubular filtering assembly, disclosed in EP 0 695 211 B1, because of improved handling and an increased stress capacity, the filter mat is surrounded on its exterior by a metal mesh covering. The covering protects the filter mat with its small mesh width. In an adhesive layer, for example formed by a two-component adhesive, the components are embedded in one another and turned toward each other. The rounded-off end of the metal mesh covering holds the ends of the filter mat between them. A cradle-like metal clamp can be provided as further limitation for the adhesive layer. The ends of filter mat and metal mesh covering engage to produce the connection point. Also, with this solution, the gelling and hardening times of the adhesive being used are to be taken into consideration in the case of further processing of the filtering assembly.

Additionally, the use of adhesives in the connection device for the filter mat ends requires special devices to be arranged on the side of the device. Such special devices prevent undesired discharge of adhesive from the connection seam. The maintenance of such special devices is costly and provides another measure of the increased production costs.

A tubular filtering assembly of this type is disclosed in EP 0 001 407. The filter mat ends are welded with one another by means of a longitudinal seam clip configured as a connection device to avoid the use of the adhesive material and to avoid the manufacturing costs involved therewith. The free arms of the known clip are configured to be elastically flexible. They can be spread apart upon thrusting of the filter mat ends therein, and can exert, on these ends, the degree of pressure required for the fixing. At the point of the transition of the two free arms of the longitudinal seam clip, this clip forms a sort of shoulder. The free ends of the filter mat engage the shoulder and/or are limited in the direction of thrusting into the clip. The filter mat ends then terminate flush with one another and assume the definitive position required for production of the weld connection. The arrangement cannot lead to being damaged and discarded. However, particularly with highly stressed filtering assemblies, such a weld seam connection can tear apart and can lead to a breakdown of the filtering assembly or even to a hydraulic volume build-up, in which the resulting filtering assembly is worn down.

SUMMARY OF THE INVENTION

Objects of the present invention are to provide a tubular filtering assembly, as well as a device for the manufacture of such a tubular filtering assembly, which ensures a connection of the filter mat ends, and which simultaneously avoids the use of adhesives that cause considerable manufacturing outlay. The assembly of the present invention consequently leads to reduced manufacturing costs for functionally reliable connection points, even under highest stress.

The plastic clip, as part of the connection device and as a result of the thermal welding, includes an embossment along at least one of its two arms. The filter mat ends are welded with one another in sealed form. A particularly tight and permanent connection of the filter mat ends can be attained in this manner, even when these ends are to be subjected to very high fluid pressures during the filtration. The expensive and costly outlay for the gluing can be completely deleted. Since the welding process can be carried out in an extremely short time period with simultaneous application of the embossment for virtual completion of the manufacture, rational manufacture is possible without use of additional epoxy resin adhesives or the like. Also, no standing or gelling time is required and the element can be used immediately or can be further processed directly after manufacture. Since the device of the present invention for the manufacture of such a filtering assembly uses an ultrasonic welding device with a strip-shaped sonotrode or a strip-shaped anvil, provided with the embossing device for embossing that arm of the connection device, an energy-efficient and particularly favorable connection process is guaranteed.

In the case of one preferred embodiment of the filtering assembly of the present invention, the filter mat includes a plastic netting and/or a metal wire netting at least on the exterior periphery. Together with that netting, the plastic clip holding the filter mat ends together includes an embossment. This embossment engages in the web structure of the netting. A particularly secure and long-lasting connection between filter mat ends is guaranteed as a result of this arrangement. The embossment preferably has rectangular, particularly quadratic embossment structures, which preferably correspond to the relevant web structure of the netting. Thus the embossing, formed of welded plastic material, can engage in the open intermediate spaces in the netting structure, to guarantee a tight connection. Since the netting is formed of plastic material, the resulting netting material is connected by welding directly with the embossing material of the relevant embossment.

In another embodiment of the filtering assembly of the present invention, the connection device is formed of a polyamide or polyester material. With the resulting thermally deformable plastic, a good weld line can then be guaranteed.

In another preferred embodiment of the filtering assembly of the present invention, the filter mat is folded in zigzag shape and is of layered construction. The layers include at least one polyester material- and/or one fiberglass mat- and/or one paper material- and/or one melt-blown material, with one high-grade steel-polyester-mix netting or the plastic netting and/or the metal wire netting being provided. With this multiple-layer construction, a particularly excellent filtering result and adaptability of the filtering assembly can be attained for the relevant filtering purposes, without the filtering operation being impaired by the weld-seam connection of the relevant assembly.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 3:
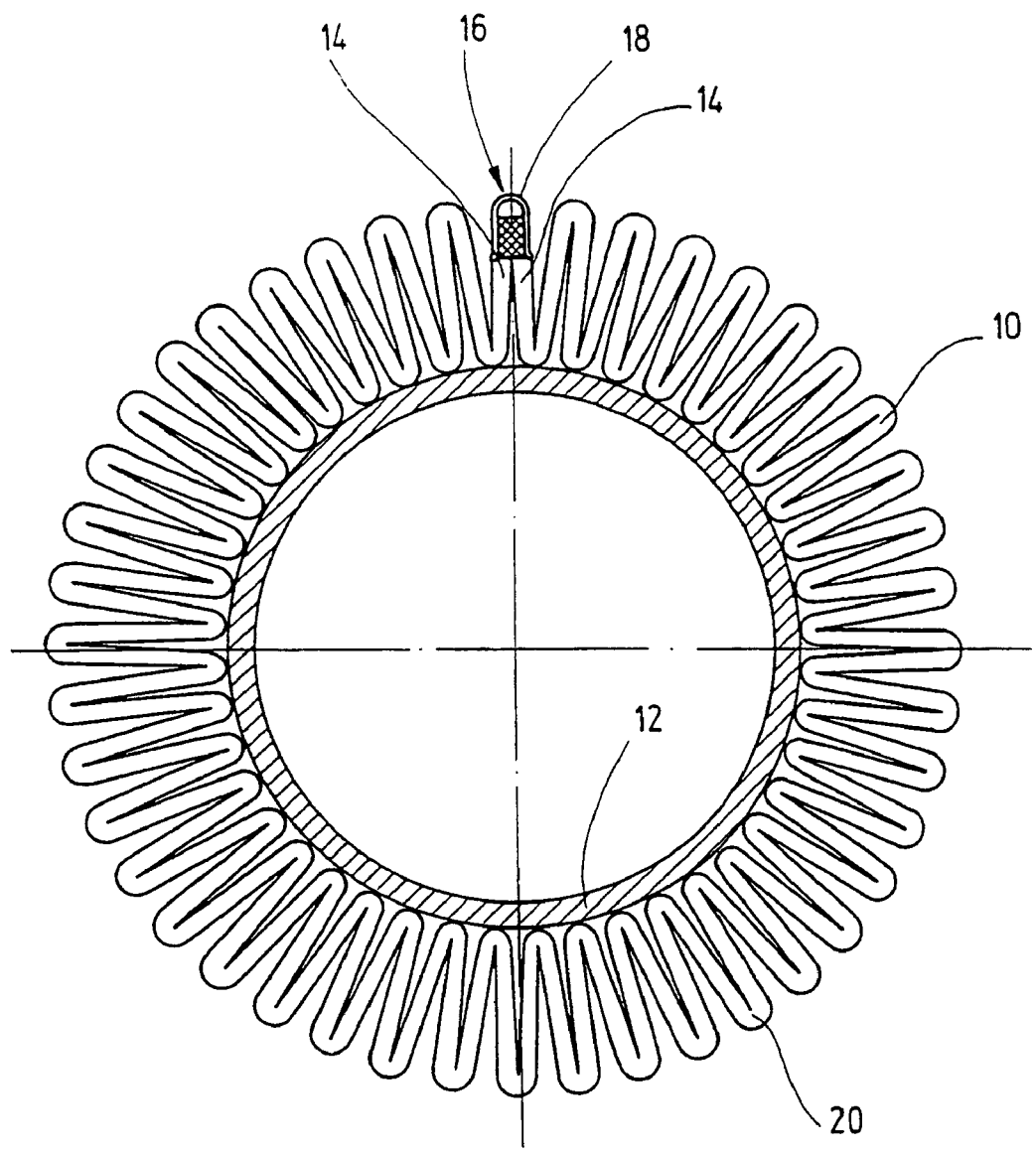
FIG. 3 is a partial end elevational view in section of the filtering assembly of FIG. 1.

The tubular filtering assembly is illustrated in a top end view in FIG. 3. This arrangement serves for filtration of fluids, and includes a zigzag—or pleat—folded filter mat 10. Filter mat 10, which is not shown in greater detail, is of a multiple-layer construction and can, for example, be of the following layer construction in sequence from the exterior into the interior:

1. metal wire netting or plastic netting or plastic lattice construction with network structure,
2. polyester material,
3. fiberglass mat or melt-blown material,
4. fiberglass mat or melt-blown material,
5. paper material or polyester material,
6. high quality steel-polyester-mix netting, and
7. metal wire netting or cloth or plastic netting or cloth, or plastic lattice construction with network structure.

Figure 1:
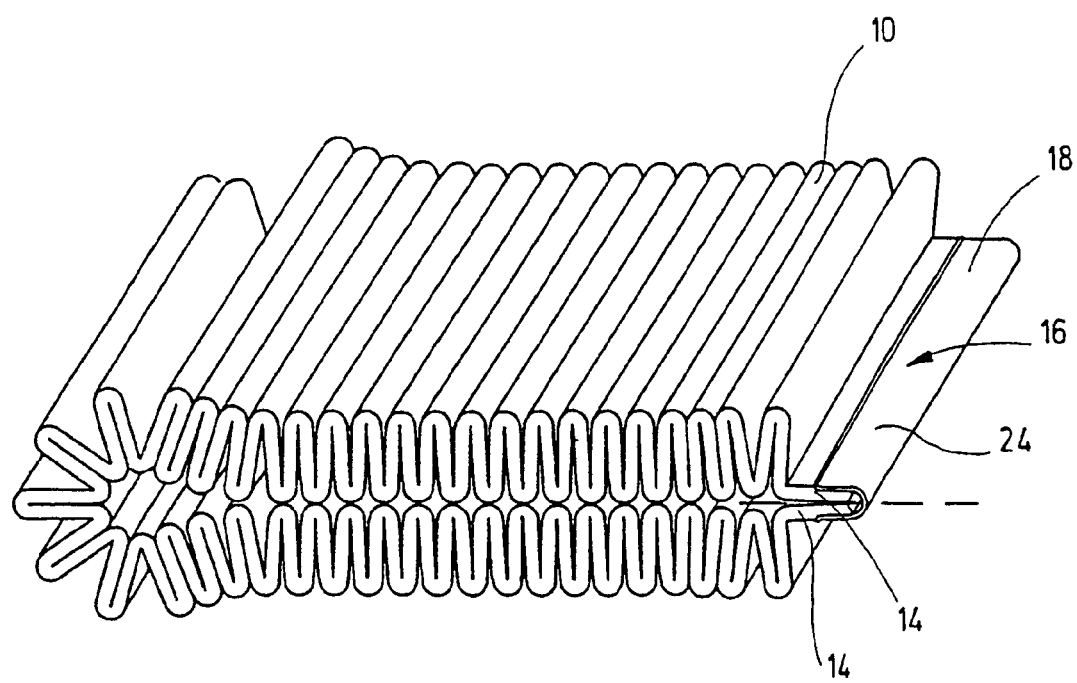
FIG. 1 is a perspective view of the filter mat with the connection clip, not welded, according to an embodiment of the present invention.
Figure 4:
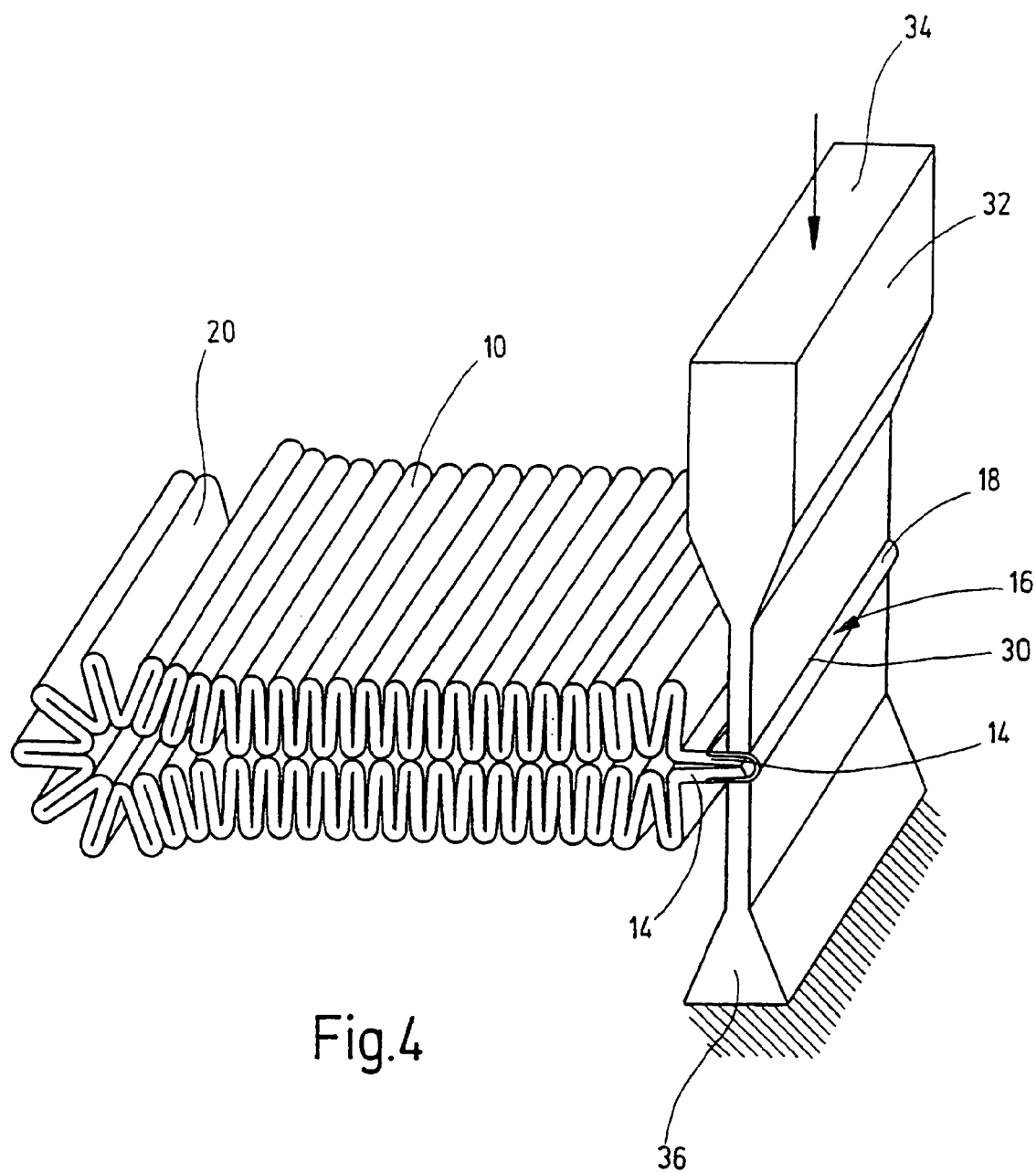
FIG. 4 is a perspective view of the main component parts of the device for the production of the weld connection according to an embodiment of the present invention.

A metal support tube 12 is provided for support of filter mat 10 in the interior of the filtering assembly. Tube 12 is provided with fluid apertures, (not shown). The two ends 14 of filter mat 10 joined to one another extend at an acute angle relative to one another, and are of somewhat shorter length than the length of the adjacent folds of filter mat 10. Depending upon the layer materials being used, tubular filter mat 10 is more or less flexible. The pleated filter strips can be laid one atop the other, as is shown in FIGS. 1 and 4, solely as an example. Support tube 12 consequently gives filter mat 10 a certain support and defines its position in the subsequently constructed filtering assembly.

A connection device, indicated in its entirety as 16, fixes the ends 14 of filter mat 10 which are adjoining one another. Connection device 16, as shown in the drawing, at least partially overlaps ends 14. Connection device 16 is configured as a connection strip in the form of a clip 18. When thrust on filter mat ends 14, clip 18 holds these ends together throughout a thermal welding process. Without additional welding, clip 18 in melted state is connected non-detachably with filter mat ends 14. Connection device 16 in the form of connection clip 18, preferably is formed of a polyamide or polyester material which has excellent thermal welding properties.

Figure 2:
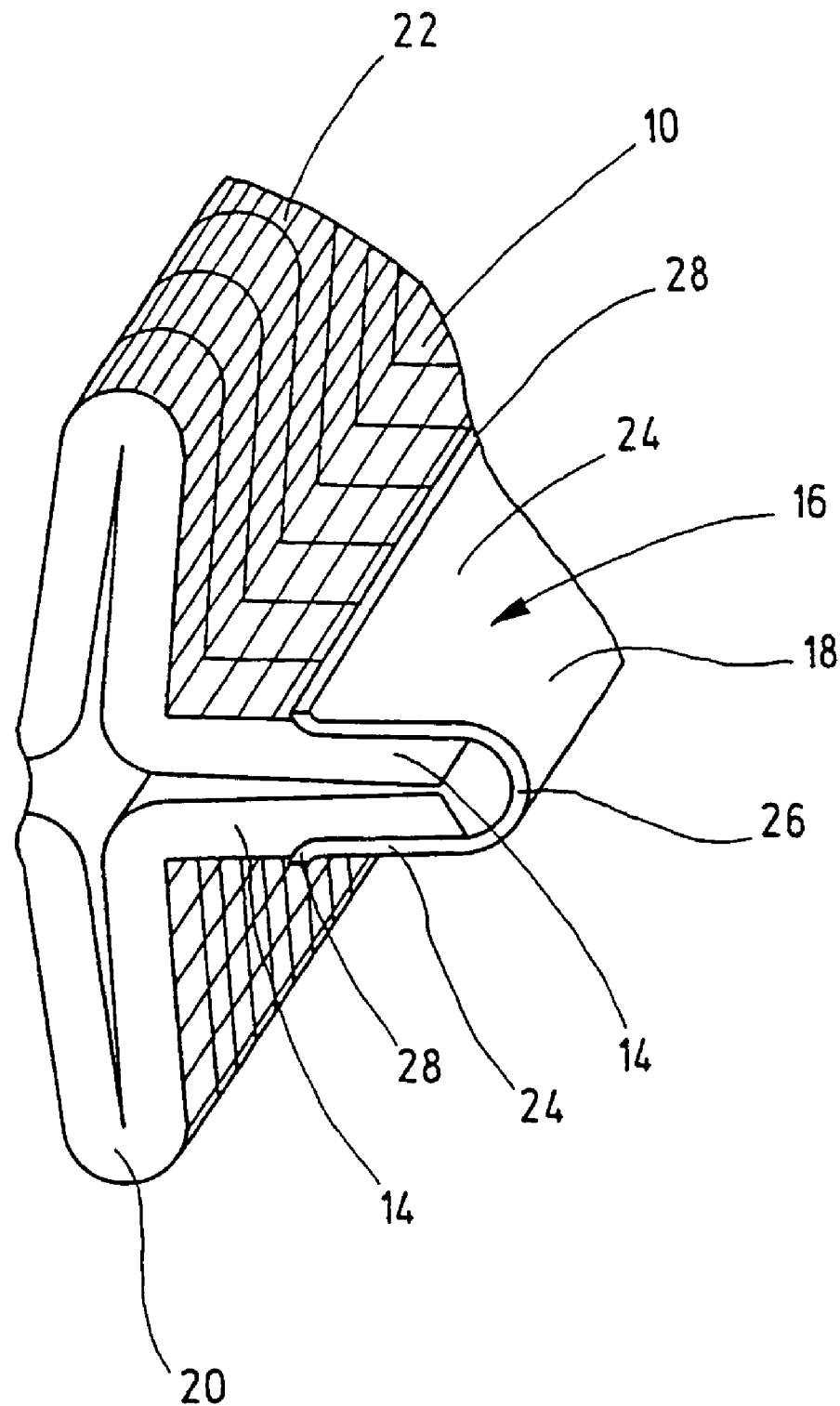
FIG. 2 is a partial, perspective view of the filter mat with connection clip of FIG. 1, not welded.
Figure 5:
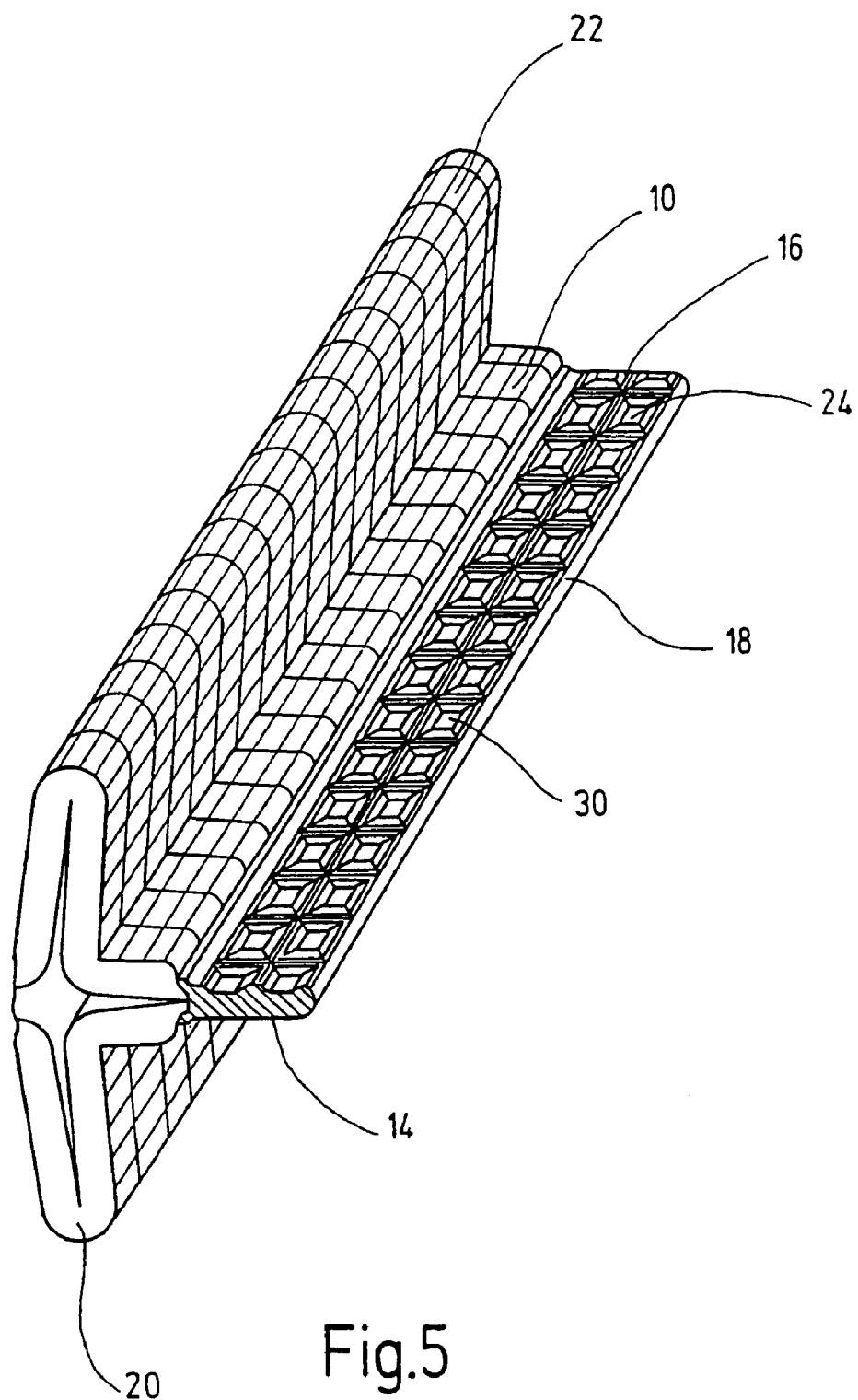
FIG. 5 is a partial perspective view of the weld seam construction by means of connection clip which can be produced by the device as in FIG. 4.

In the drawings, the individual layers of filter mat 10 for simplicity are represented simply as layered unit 20. In FIGS. 2 and 5 the lattice-like metal wire netting arranged outermost on the mat is indicated with reference 22.

As shown particularly in FIGS. 1 and 2, the plastic or connection clip 18 is thrust with its two free surrounding arms 24 onto the free ends 14 of filter mat 10, and holds these parts together by means of its inherent elasticity. The two surrounding arms 24 of clip 18 are connected with one another by means of a curved connection piece or bight 26. Connection piece 26, because of the surrounding arms 24 extending in alignment with one another in this area, forms a definite contact for the free ends 14 of filter mat 10. In this manner, it is guaranteed that the two ends 14 end at approximately the same point and are in definitive contact with one another for the welding process provided thereafter, to be described hereinafter.

Because of the inherent elasticity of clip 18, these filter mat ends can be given a definite structural option in the area of the surrounding arms 24, and at, but not in, the curved contact area of connection piece 26. Plastic clip 18 is then optimized, so that the free thrust-on opening for filter mat ends 14 is maintained somewhat smaller than the width of the two filter mat ends 14 lying one over the other. Because of the plastic elasticity ratio of clip 18, a pressing contact of free filter mat ends 14 with one another occurs.

A particularly cost-favorable feature for manufacture of clip 18 is that it is comparable with filter mat 10 in that the filter mat is formed of folded or pleated curvatures which are separate from one another, and thus, in turn end in a longitudinal clip 18. To not impair the thrust-on capability of filter mat ends 14, clip 18, in the area of the free ends of the two surrounding arms 24, is provided with a curved auxiliary feed device 28 inclined or angled outward toward the exterior.

Plastic clip 18 is thermally deformed during the welding process, and at that time, is provided with an embossment 30 (see FIG. 5) corresponding essentially to the lattice-like structure of metal wire netting 22. In other words, the thermally deformed plastic material of clip 18 penetrates into the open spaces within the wire lattice structure, so that a particularly tight connection is attained. That connection is still further sustained in that the layered unit 20, which likewise is at least partially of plastic materials, is welded together with clip 18. An ultrasonic welding process is preferably used for the welding of filter mat ends 14 together with connection device 16. However, other thermal welding processes could also be used. As is shown especially in FIG. 3, the lengthwise ratios in any case in the area of the connection seam are selected so that connection device 16 as seen from a radial viewpoint ends along the radial exterior periphery of filter mat 10. With clip 18 in a molten state, filter mat ends 14 are then embedded therein, so that a non-detachable permanent connection is extant for the subsequent filtration using filter mat 10 and/or using the filtering assembly. The aforementioned embossment 30 can occur along one surrounding arm 24 or along both surrounding arms 24.

The ultrasonic welding device 32 with which the thermal welding process can be performed is shown in FIG. 4. The ultrasonic welding device includes a strip-like sonotrode 34 for the welding process. The sonotrode can be displaced in the direction of the arrow in FIG. 4 from a starting position and moved in the direction toward the welding material in the form of longitudinal seam clip 18 during a welding process. For the welding process, filter mat 10 with its filter folds as shown in FIG. 4 has one end lying atop the other. Then, the welding of filter mat ends 14 with clip 18 is undertaken, following the mounting of clip 18. The resulting welding process can be simplified by auxiliary handling aids. However, it is also possible to manually feed filter mat 10 into welding device 32. Following termination of the welding process, sonotrode 34 is raised again, and a weld seam construction is obtained as shown in FIG. 5. Filter mat 10 is then brought into tubular formation and is mounted on support tube 12 for the further manufacturing processes regarding the filtering assembly.

As a result of the welding process, the welded edge is sealed to prevent fiber migration, so that glass fibers, for example from the filter medium, are retained in filter mat 10. Clip 18 is of such dimensions in relation to the plastic volume required that in any case the connection can be produced without additional welding. The filter mat of the present invention, as well as the device for the manufacture of such a filtering assembly, facilitate rational manufacture without use of connecting adhesive material, such as epoxy resin adhesive, so that there is no down time for the hardening of the adhesive. Also, the filter mat or the filtering assembly can be further processed directly following its manufacture.

While an embodiment has been chosen to illustrate the invention, it will be understood by those skilled in the art that various changes and modifications can be made therein without departing from the scope of the invention as defined in the appended claims.

What is claimed is:

1. A tubular filter assembly for filtering fluids, comprising:
a filter mat having first and second ends adjacent to and overlapping one another;
a connection clip configured as a connection strip and thrust over said ends to overlap at least partially said ends, said connection clip being formed of thermally deformable plastic and being thermally welded to said ends to fix said ends together without additional material, said clip having first and second arms holding said ends in place for welding; and
an embossment along at least said first arm of said clip formed during welding of said clip to said ends for welding said ends of said filter mat together in a compressed form.

2. A tubular filter assembly according to claim 1 wherein said filter mat has a plastic netting and/or a metal wire netting on at least an exterior surface of said filter mat, said netting having openings therein; and
said clip surrounds said ends and said netting thereon with said embossment engaged in said openings in said netting.

3. A tubular filter assembly according to claim 2 wherein said embossment comprises rectangular shaped embossing elements.

4. A tubular filter assembly according to claim 2 wherein said embossment comprises quadratic shaped embossing elements.

5. A tubular filter assembly according to claim 4 wherein said embossing elements correspond in shape to said openings in said netting.

6. A tubular filter assembly according to claim 5 wherein said embossing elements extend through the respective openings in said netting.

7. A tubular filter assembly according to claim 2 wherein said embossment extends through said openings.

8. A tubular filter assembly according to claim 1, wherein said thermally deformable plastic is a polyamide or polyester material.

9. A tubular filter assembly according to claim 1, wherein said filter mat is folded in a zigzag shape, and has a layered construction comprising as layers at least one polyester material and/or one fiberglass mat and/or one paper material and/or one melt-blown material and/or one high quality steel-polyester-mix netting or plastic netting or metal wire netting.

10. A tubular filter assembly according to claim 1 wherein said ends of said filter mat are welded together with said connection clip by an ultrasonic weld.

11. A tubular filter assembly according to claim 1 wherein a support tube supports said filter mat on at least one of an interior periphery and an exterior periphery thereof.

12. A tubular filter according to claim 1 wherein said connection clip with said ends is radially aligned with an exterior periphery of said filter mat.

13. A system for manufacturing a tubular filter assembly, comprising:
a filter mat having first and second ends adjacent to and overlapping one another;
a connection clip configured as a connection strip and thus over said ends to overlap said ends, said connection clip being formed of thermally deformable plastic and being thermally welded to said ends to hold and fix said ends together without additional material, said clip having first and second arms with said ends being between said arms;
an embossment along at least said first arm of said clip formed during welding of said clip to said ends for welding said ends of said filter mat together in a compressed form;
an ultrasonic welding device having a strip-shaped sonotrode and a strip-shaped anvil receiving said connection clip and said ends of said filter mat therebetween and to thermally weld said clip and said ends; and
an embossing device on at least said anvil for forming said embossment on said first arm of said connection clip.

14. A system for manufacturing a tubular filter assembly according to claim 13 wherein
said filter mat has a netting with openings therein on an exterior surface of said filter mat; and
said embossment comprises embossing elements engaging through and corresponding in shape to the respective openings in said netting.

15. A process for manufacturing a tubular filter assembly, comprising the steps of:
folding a filter mat to locate first and second ends thereof adjacent to and overlapping one another;
thrusting a connection clip, configured as a connection strip, over the ends of the filter mat to overlap the ends, the clip being formed of thermally deformable plastic and having first and second arms with the ends being between the arms;
thermally welding the clip and the ends of the filter mat to hold and fix the ends together without additional material; and
during the thermal welding, forming an embossment along at least the first arm of the clip to form a seal between the clip and the ends.

16. A process according to claim 15 wherein the thermal welding and embossing is performed by an ultrasonic welding device receiving the connection clip and the ends of the filter mat between a strip-shaped sonotrode and a strip-shaped anvil; and
the forming of an embossment is performed by an embossing device on at least the anvil.

17. A process according to claim 16 wherein the embossment is formed as embossing elements corresponding in shape to the openings in the netting.

18. A process according to claim 17 wherein said embossing elements extend through the respective openings.

19. A process according to claim 15 wherein the clip is placed on the ends of the filter mat to surround the ends with a plastic netting and/or a metal wire netting provided on at least an exterior surface of the filter mat; and
the embossment is formed to engage openings in the netting.

20. A process according to claim 15 wherein the embossment is forced through openings in netting on an exterior surface of said filter mat.

* * * * *